United States Patent [19]

Abrams et al.

[11] 3,813,550

[45] May 28, 1974

[54] PYROELECTRIC DEVICES

[75] Inventors: Richard Lee Abrams, Morris Township, Morris County; Alastair Malcolm Glass, Murray Hill, both of N.J.

[73] Assignee: Bell Telephone Laboratories Incorporated, Murray Hill, N.J.

[22] Filed: Dec. 12, 1972

[21] Appl. No.: 314,376

Related U.S. Application Data

[63] Continuation of Ser. No. 35,309, May 7, 1970, abandoned.

[52] U.S. Cl. .......... 250/338

[51] Int. Cl. .......... G01t 1/16

[58] Field of Search .......... 250/338, 349, 353, 199; 136/213

[56] References Cited

UNITED STATES PATENTS

| | | | |
|---|---|---|---|
| 2,985,759 | 5/1961 | Goldsmith | 250/353 |
| 3,398,281 | 8/1968 | Treharne et al. | 250/338 |
| 3,453,432 | 7/1969 | McHenry | 250/338 |
| 3,513,312 | 5/1970 | Weiner | 136/213 |
| 3,571,592 | 3/1971 | Glass | 250/338 |
| 3,581,092 | 5/1971 | Pearsall et al. | 250/349 |

*Primary Examiner*—Archie R. Borchelt
*Assistant Examiner*—Davis L. Willis
*Attorney, Agent, or Firm*—G. S. Indig

[57] ABSTRACT

The frequency response of crystalline pyroelectric detectors for modulated infrared carriers is increased by mechanical damping so as to avoid a mechanical resonance limitation. Clean response for pulse trains at frequencies in excess of a megabit per second at incident power below 1 watt is attainable.

5 Claims, 5 Drawing Figures

INVENTORS: R. L. ABRAMS
A. M. GLASS
BY George S. Indig
ATTORNEY

PYROELECTRIC DEVICES

This is a continuation of application, Ser. No. 35,309, filed May 7, 1970 and now abandoned.

BACKGROUND OF THE INVENTION

1. Field of the Invention

The invention is concerned with detectors of electromagnetic radiation operating on a pyroelectric principle. Exemplary devices show a frequency response of many megahertz to an incident beam with infrared carrier frequencies at a power level of less than a watt.

2. Description of the Prior Art

The detection of infrared electromagnetic radiation, that is, radiation having a wavelength greater than 7,000 angstrom units, has always been somewhat more difficult than the detection of shorter wavelength radiation. Common techniques involve the conversion of such energy to heat energy which then results in a physical change in some selected material due simply to a rise in temperature. An example is the Golay cell which measures the expansion of a confined body of gas so arranged as to absorb the infrared energy.

It is clear that use of such heating effects result in detectors which are limited both in their modulation frequency response and in their sensitivity. While improvements over the years have resulted in devices which may sense power levels as low as $3\times10^{-7}$ milliwatts $cps^{-1/2}$, typical modulation frequency response permits detection at frequencies no higher than of the order of a few kilohertz.

The deficiency in infrared detectors has been emphasized by the development of the laser. Most lasers and all solid state CW lasers operate at infrared or near-infrared frequencies. As an example, the $CO_2$ laser, at this time the most powerful gas laser, characteristically operates at 10.6 microns.

Communication engineers naturally consider coherent radiation produced by laser oscillation to represent a further extension of the available usable carrier frequencies. Much study has been directed to the development of the various circuit elements such as modulators, oscillators, etc., required in such a communication system. The advantage of utilizing the higher frequency carriers now made available is enhanced bandwidth. Modulators and certain other circuit elements have already been operated at frequencies approaching a gigahertz, and there is consequently some promise that large bandwidth laser carrier systems will be developed.

A major lacking in such a communication system is the detector. A usable detector must be capable of operating at the same order of frequency as the other circuit elements. The only structures reported with such frequency capability at infrared frequencies operate at very low temperature (liquid helium). The best known of these devices is copper-doped germanium. A need exists for an infrared detector capable of high frequency operation and useful at normal operating temperatures.

Another class of detectors which has received some attention depends upon the voltage developed due to the pyroelectric effect accompanying the change in polarization resulting from heating due to absorption of irradiation. A vast class of materials is pyroelectric and many included materials are quite sensitive. Unitl recently, it was thought, however, that frequency response of pyroelectric crystals was no greater than 10 or 100 kilohertz. This state of the art is exemplified by Vol. 6, *Japanese Journal of Applied Physics*, 120 (1967), which describes such a detector utilizing triglycene sulfate.

It was recognized at that time that the response of a pyroelectric detector is determined by the change in polarization with temperature ($dP_s/dT$) and, under certain circumstances, also by electrical conductivity. The assumption that devices would not operate sufficiently at high frequency was supported by the measured values of ($dP_s/dT$).

As reported in Vol. 13, *Applied Physics Letters*, 147 (1968), it was recently discovered that a class of ferroelectric materials exemplified by mixed crystals of barium strontium niobate could be incorporated in pyroelectric detectors to result in significantly higher frequency response. It was recognized that these materials have substantially higher acoustic loss than that of earlier investigated pyroelectric materials. Based on this work, it was postulated that one significant limitation on frequency response was avoided by poor acoustic properties. In accordance with this assumption, troublesome acoustic resonances due to the piezoelectric coupling to the volume changes occurring by reason of thermal expansion and contraction were avoided. Inspection of earlier data on other materials, in fact, disclosed a frequency limitation which could be attributed to piezoelectric "ringing."

Considerable work has been carried out on the barium strontium niobate, and this and related materials are considered quite promising for infrared detection. The class of materials having the required high acoustic damping as well as the required pyroelectric characteristics, however, does not appear to be extensive. In particular, the series of barium strontium niobate compositions have certain attendant characteristics, for example, high dielectric constant, which impose restrictions on circuit design.

SUMMARY OF THE INVENTION

In accordance with the invention, it has been found that suitable mounting, as by use of adhesives and/or clamps, may include sufficient acoustic loss to eliminate the frequency limiting effect of mechanical resonance. In fact, utilizing the principles of the invention, this limitation on response may be avoided in any pyroelectric material whatsoever. While figures of merit in certain uses do not necessarily represent an improvement over that for barium strontium niobate compositions, the freedom of choice of material now permitted is valuable. For example, lithium tantalate, $LiTaO_3$, a highly developed material by reason of its excellent properties both as a piezoelectric transducer and as an electro-optic element, has a relatively low dielectric constant and permits certain design approaches not feasible with barium strontium niobate. Its high resistance and low dielectric constant permit use of face electrodes and so allow fabrication of large area detectors particularly useful for detection of low level signals.

DETAILED DESCRIPTION

1. The Figures

The figures are discussed in terms of an illustrative procedure utilized in the inventive study. In fact, the description of FIGS. 1, 2, 4A and 4B are of the nature of a specific example. Various parameters, such as the detector material, the light source, etc., are to be considered as illustrative only. The description is generalized in later section.

Figure 2:
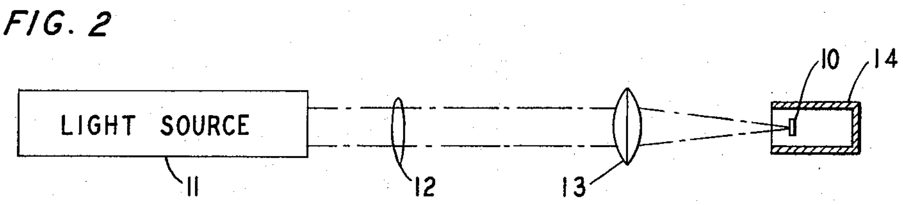
FIG. 2 is a schematic representation of an experimental arrangement utilized for producing data such as that represented by FIGS. 4A and 4B.
Figure 1:
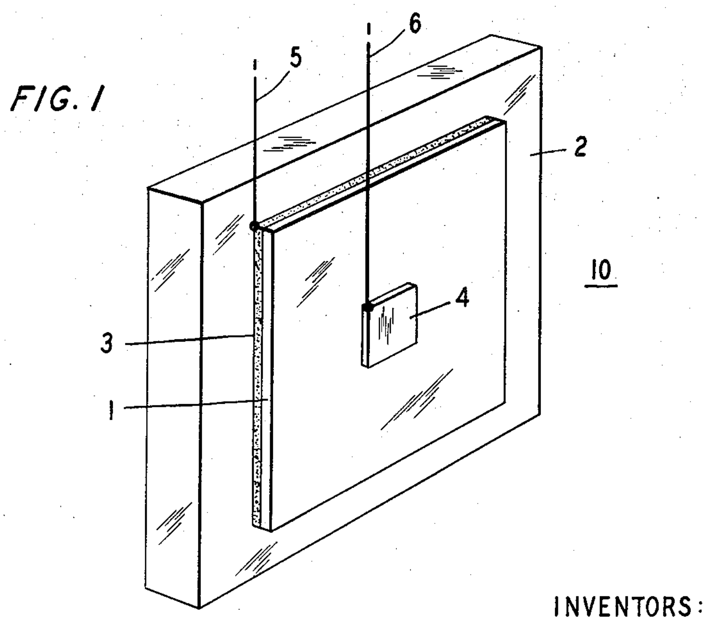
FIG. 1 is a perspective view of a damped detector in accordance with the invention.
Figure 4A:
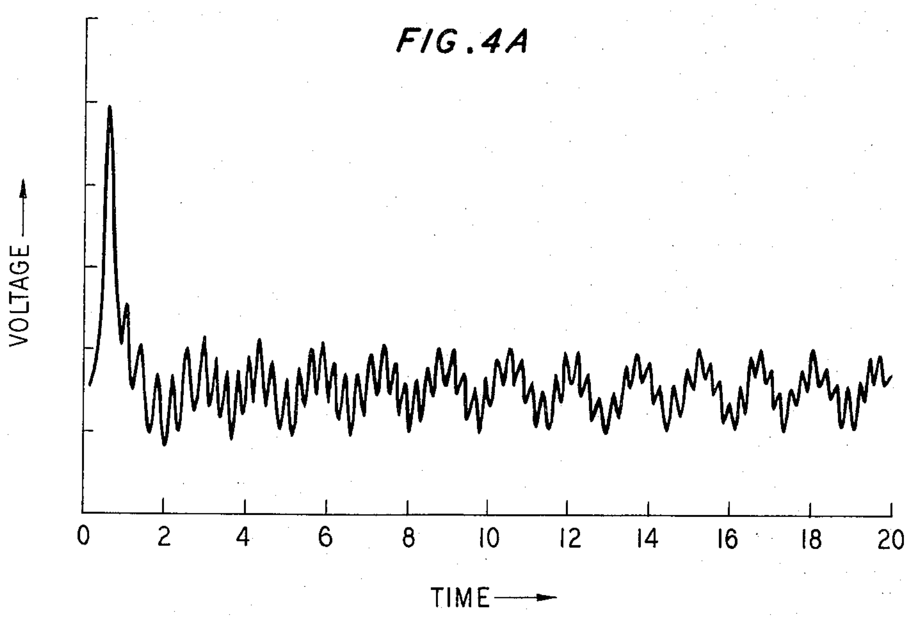
FIGS. 4A and 4B, on coordinates of detected signal strength in volts and time in microseconds, are plots showing the response of a high-acoustical quality pyroelectric detector to a light pulse as freely suspended and acoustically damped, respectively.
Figure 4B:
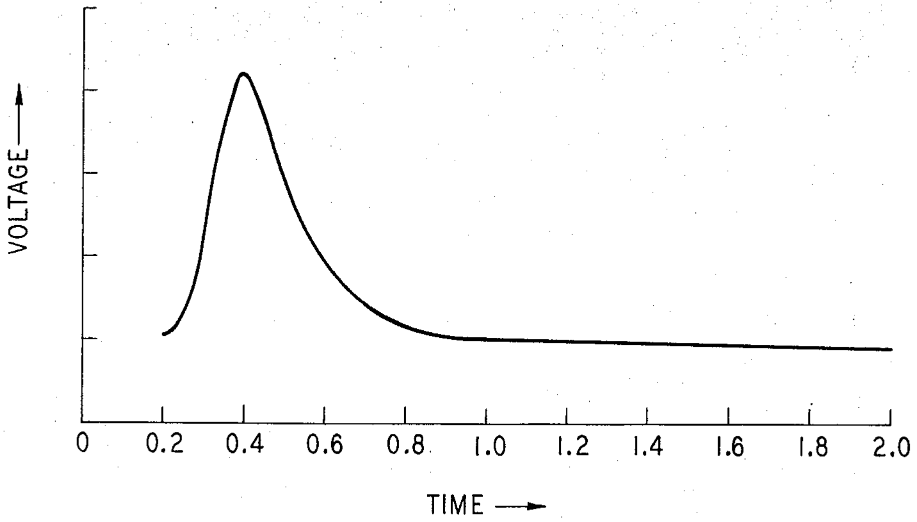

Since the arrangement of FIG. 2 utilizing the clamping arrangement of FIG. 1 in fact resulted in data of the form depicted in FIG. 4B, these figures are discussed together. The data shown in FIG. 4A is that which results for a freely suspended detector in utilizing a clamping arrangement in accordance with the invention.

In FIG. 1, the detector crystal material of detector 10 in the example discussed is ferroelectric lithium tantalate, $LiTaO_3$. The crystalline wafer is a c-axis plate (the c-axis is the polar axis). Plate dimensions are 1.5mm by 1.5mm by 0.02mm. The crystalline section 1 is mounted on a glass slide 2 by means of a conducting epoxy layer 3. An electrode 4 is affixed to the exposed face of the plate. This electrode may be constructed of transparent or absorbing material depending on the wavelength to be detected and the absorptive nature of the crystalline material. Electrical contact is made to epoxy layer 3 and electrode 4 by means of leads 5 and 6 connected to voltage or current sensing means, not shown, respectively. The detailed structure of FIG. 1 is exemplary of structures suitable for use of pyroelectric detector 10 shown in FIG. 2.

For the purpose of the example discussed and now considering FIG. 2, light source 11 is a Q-switched $CO_2$ laser operating at 10.6 micron. The coherent beam 12 emanating from this source is focused by a lens 13 which, for the infrared wavelength discussed, is constructed of germanium. The focal length of the lens is such as to focus the beam energy on detector 10. Housing 14 may serve merely as a mechanical support means or may be so arranged as to cavitate the electromagnetic radiation to be detected thereby resulting in an increase in sensitivity.

In a particular experiment, a typical pulse produced by the Q-switched $CO_2$ laser was 200 nanoseconds wide and had a peak power of about 100 watts.

FIG. 4B, on coordinates of volts and microseconds, shows the pulse shape actually detected and, as seen, faithfully reproduces the laser pulse. Similar experiments utilizing the depicted apparatus of FIG. 2 have resulted in faithful detection of laser pulses as short as 20 nanoseconds. The rise time of the particular detector used was measured as less than 5 nanoseconds.

The plot of FIG. 4A on the same coordinates of volts and time in microseconds depicts data taken from a similar experiment in which the detector was freely suspended. In the absence of damping, such as provided by the epoxy layer 3 of the FIG. 1, it is seen that, while the pulse form is detectable, it is accompanied by two oscillatory patterns representing two resonance modes for the crystal. The two traces, depicting transverse and longitudinal modes, clearly indicate two oscillatory signals in addition to the fundamental pulse. For the particular detector utilized, the transverse and longitudinal signals were at frequencies of 3MHz and 640 kHz which corresponded to the fundamental oscillations of the detector. Both traces were in good agreement with the detector dimensions and the measured sound velocity in $LiTaO_3$. The signal-to-noise ratio for the freely suspended detector is approximately 4 to 1 whereas the ratio for the damped detector, as shown by the data of FIG. 4B, is several orders of magnitude higher.

Figure 3:
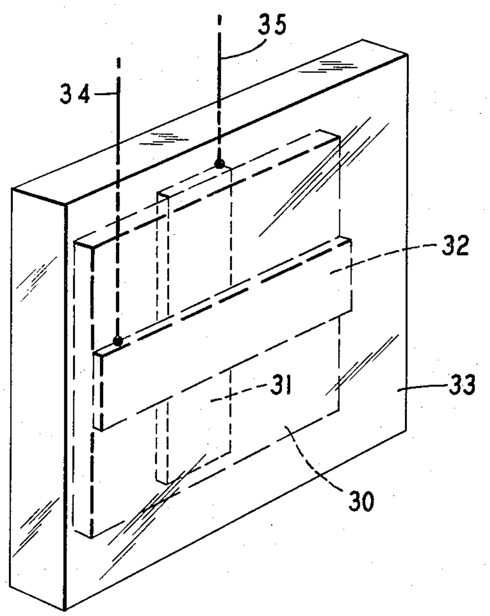
FIG. 3 is a sectional view of a digital structure alternative to that of FIG. 1 utilizing a different type of damping.

The detector of FIG. 3 represents an alternative arrangement in which a pyroelectric crystal wafer 30 surfaced on one face by electrode 31 and on the other by electrode 32 is encased within a suitable transparent medium 33. For infrared wavelength, such as that produced by the $CO_2$ laser, there are many suitable encapsulents all of which manifest the requisite transparency and damping properties. Exemplary materials are thermoplastic polymers, such as polyethylene. Electrical contact is made by leads 34 and 35 connected to electrodes 32 and 31, respectively. The orthogonal electrode arrangement depicted was chosen to minimize capacitance and simplify construction.

2. SUITABLE DETECTOR MATERIALS

In general, the frequency response of any pyroelectric material may be improved by the inventive technique. Preferred characteristics are, however, determined by practical device considerations. Lithium tantalate was chosen for its high pyroelectric figure of merit ($\lambda/\sqrt{\epsilon \tan\delta}$) (numerically equal to 0.048 microcoulombs/cm²/°C), in which $\lambda$ is the pyroelectric coefficient, i.e., the charge developed per unit change in temperature, $\epsilon$ is the dielectric permittivity and $\tan\delta$ is the dielectric loss tangent. This particular figure of merit is useful primarily in the design of a large area detector with face electrodes. From a practical standpoint, with $10^{-3}$ cm thick detectors, large area means a wafer area of the order of at least one-half millimeter on a side. The value of ($\lambda/\sqrt{\epsilon \tan\delta}$) is desirably at least about $10^{-7}$ and preferably $10^{-8}$ coulombs/cm²/°C. Illustrative materials evidencing this property are triglycene sulfate and triglycene selenate and $LiTaO_3$.

The above material characteristics represent a preferred class in terms of sensitivity. Where incident signal strength is below $10^{-9}$ watts, selection should be made accordingly. For many applications where sensitivity is not of primary interest, advantageous use may be made of materials showing smaller figures of merit. Under these circumstances, materials may be selected on the basis of availability, growth, and general physical and electrical properties.

3. Damping

It is the essence of the invention that for any given pyroelectric material and for any given device design frequency response is increased to a value above the lowest fundamental resonance of the detector element by damping. To this end, it is appropriate to impose design limitations on the requisite magnitude of damping.

This is conveniently expressed in terms of the acousitc loss of the entire assembly including the pyroelectric element as well as any attached structure. The requisite degree of damping is dependent on a number of parameters, i.e., crystal dimensions, acoustic velocity, etc. In its broadest aspect, improved frequency response results when the lowest resonant frequency of the detector element is eliminated as a limitation on frequency response. For still higher response, higher frequency fundamentals and also harmonics are eliminated. Successively greater improvement in frequency response for a given detector requires successively increased damping. This follows since each successive resonance must be damped out within the ever shortened period corresponding with the wavelength of the higher resonance.

In normalized terms, the above desiderata may be expressed as requiring a minimum damping of $6f$ db/second where $f$ is the highest resonance frequency to be damped. It follows that materials, upon which the invention is beneficially practiced, evidence a lesser loss as freely suspended. A preferred maximum loss in the same terms for the freely suspended element is $5f$ db/second.

In terms of a practically small detector of the order of one millimeter square by 10 microns thick having a typical acoustic velocity of approximately $5\times10^5$ centimeters per second, the required loss is 20db/microsecond for operation above the frequency of the lowest fundamental extensional mode of about 3.5 MHz.

Since prior freely suspended pyroelectric detectors were sometimes capable of frequency response of the order of 10 or 100 kHz, a preferred embodiment, according to the present invention, may be defined in terms of a higher frequency response, for example, 1MHz, and a still more preferred embodiment may be defined in terms of a structure capable of a frequency response at some typical signal level of the order of 1gHz. In terms of typical materials, the minimum required induced loss introduced by the damped structures of the invention are 6db/microsecond and 6db/nanosecond for the 1MHz and 1gHz limits, respectively.

In general, the requirements relating to bonding media as well as substrate materials are noncritical. Generally, materials are chosen for adhesion properties and transmission properties relative to the wavelength to be detected. In general, bonding media, which result in intimate bonding, are suitable. Exemplary materials are the thermosetting resins such as the various epoxies, polyurethane, rubber, etc., and thermoplastic materials such as polymethylmethacrylate, polyethylene, etc.

4. Other Considerations

Pyroelectric detectors are of primary interest at infrared frequencies where many other detector structures, particularly those operating at room temperature, are lacking in sensitivity. However, pyroelectric detectors are known to be useful both above and below this range and may be used for detection of millimeter waves as well as light in the visible spectrum. The damping structures of the invention are appropriately incorporated at any wavelength to which the detector is inherently sensitive or may be made sensitive, as by coating, so as to increase modulation frequency response. In general, discussion has been in terms of a sinusoidally modulated signal. Discussion in these terms is meaningful to the design engineer seeking to incorporate the inventive structures in any system whether PCM or analog, whether sinusoidal or nonsinusoidal.

What is claimed is:

1. Pyroelectric device comprising a crystalline body of a pyroelectric medium provided with means for sensing a pyroelectric response to incident radiation, said body manifesting a maximum acoustic loss of $5f$ db per second at a frequency corresponding with a resonant frequency for such body as freely suspended, characterized in that the said body is clamped so as to increase its acoustic loss to a value of at least $6f$ db per second at said frequency and in which f is the highest resonance frequency to be damped, said pyroelectric device being provided with means for irradiating same with electromagnetic radiation in the infrared spectrum, said irradiation being modulated so as to contain information-significant frequency components equivalent to a pulse train rate in excess of a megabit per second.

2. Device of claim 1 in which the pyroelectric figure of merit $\lambda/\sqrt{\epsilon\tan\delta}$, where $\lambda$ is the pyroelectric coefficient, $\epsilon$ is the dielectric permittivity, and $\tan\delta$ is the dielectric loss tangent, is at least $10^{-7}$ coulombs/cm²/°C, in which the said body is in the form of a sheet having two major faces and in which the said sensing means comprises electrodes contacting such major faces.

3. Device of claim 2 in which one of said electrodes is a conducting adhesive which also acts to clamp said body.

4. Device of claim 2 in which the said body consists essentially of $LiTaO_3$.

5. Device of claim 2 in which the said figure of merit is at least $10^{-8}$.

* * * * *

UNITED STATES PATENT OFFICE
CERTIFICATE OF CORRECTION

Patent No. 3,813,550 Dated May 28, 1974

Inventor(s) Richard L. Abrams and Alastair M. Glass

It is certified that error appears in the above-identified patent and that said Letters Patent are hereby corrected as shown below:

Column 2, line 46, change "include" to read --induce--.

Column 5, line 1, change "acousitc" to read --acoustic--.

Signed and sealed this 5th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.